(12) United States Patent
Breuer et al.

(10) Patent No.: US 10,880,827 B2
(45) Date of Patent: Dec. 29, 2020

(54) POWER SAVING MECHANISM FOR MOBILE TERMINAL

(71) Applicant: GEMALTO M2M GMBH, Munich (DE)

(72) Inventors: Volker Breuer, Bötzow (DE); Ronald Blum, Berlin (DE)

(73) Assignee: THALES DIS AIS DEUTSCHLAND GMBH, Munich (DE)

( * ) Notice: Subject to any disclaimer, the term of this patent is extended or adjusted under 35 U.S.C. 154(b) by 4 days.

(21) Appl. No.: 15/659,804

(22) Filed: Jul. 26, 2017

(65) Prior Publication Data

US 2017/0325160 A1 Nov. 9, 2017

Related U.S. Application Data

(66) Continuation of application No. 14/345,798, Substitute for application No. PCT/EP2012/068550, filed on Sep. 20, 2012, now Pat. No. 9,743,349.

(30) Foreign Application Priority Data

Sep. 21, 2011 (EP) ...................................... 1182217

(51) Int. Cl.
*H04W 52/02* (2009.01)
*H04W 48/18* (2009.01)
*H04W 88/06* (2009.01)

(52) U.S. Cl.
CPC ....... *H04W 52/0206* (2013.01); *H04W 48/18* (2013.01); *H04W 52/0245* (2013.01); *H04W 88/06* (2013.01); *Y02D 30/70* (2020.08)

(58) Field of Classification Search
CPC ............... H04W 68/12; H04W 76/048; H04W 52/0206; H04W 52/0245; H04W 88/06; H04W 48/18; Y02B 60/50
See application file for complete search history.

(56) References Cited

U.S. PATENT DOCUMENTS

2004/0116110 A1 6/2004 Amerga et al.
2006/0262739 A1* 11/2006 Ramirez ............... H04W 88/06
370/311

(Continued)

FOREIGN PATENT DOCUMENTS

DE 10 2009 029 937 A1 10/2010
EP 1 300 038 B1 12/2006
WO WO 2009/033945 A1 3/2009

OTHER PUBLICATIONS

International Search Report (PCT/ISA/210) dated Dec. 13, 2012, by the European Patent Office as the International Searching Authority for International Application No. PCT/EP2012/068550.

(Continued)

*Primary Examiner* — Un C Cho
*Assistant Examiner* — Peter K Mak
(74) *Attorney, Agent, or Firm* — Buchanan Ingersoll & Rooney PC

(57) ABSTRACT

A mobile terminal for participating in a mobile network and adapted to perform a power consumption sensitive cell reselection includes a detector configured to detect presence of a first possible connection to the mobile network via a first technology, and a second possible connection to the mobile network via a second technology. A selector is configured to identify which of the first possible connection and the second possible connection causes less energy consumption in the mobile terminal in a low-power mode of operation. A controller is configured to connect the mobile terminal to the mobile network through the identified possible connection. A network entity for supporting a mobile terminal in performing a power consumption sensitive cell reselection is also disclosed.

10 Claims, 1 Drawing Sheet

(56) References Cited

U.S. PATENT DOCUMENTS

| | | |
|---|---|---|
| 2006/0281486 A1 | 12/2006 | Ngai et al. |
| 2008/0113692 A1 | 5/2008 | Zhao et al. |
| 2008/0293426 A1* | 11/2008 | Kim ................. H04W 52/0216 455/450 |
| 2008/0318643 A1 | 12/2008 | Manna et al. |
| 2010/0130237 A1 | 5/2010 | Kitazoe et al. |
| 2010/0184458 A1 | 7/2010 | Fodor et al. |
| 2010/0255843 A1 | 10/2010 | Huang et al. |
| 2011/0077003 A1* | 3/2011 | Shin ..................... H04W 48/16 455/434 |
| 2011/0244880 A1 | 10/2011 | Chin et al. |
| 2012/0120860 A1* | 5/2012 | Chui ..................... H04B 1/711 370/311 |
| 2012/0140689 A1* | 6/2012 | Pelletier ............... H04L 5/0005 370/311 |
| 2012/0300685 A1* | 11/2012 | Kim ..................... H04W 68/02 370/311 |
| 2013/0023275 A1* | 1/2013 | Mutya ................... H04W 88/06 455/452.1 |
| 2013/0040697 A1 | 2/2013 | Ekici et al. |
| 2014/0004842 A1* | 1/2014 | Lindoff ................ H04W 8/183 455/418 |
| 2014/0106747 A1* | 4/2014 | Josso ................... H04W 88/06 455/435.2 |
| 2014/0128082 A1* | 5/2014 | Chirayil ............... H04W 68/02 455/438 |

OTHER PUBLICATIONS

Written Opinion (PCT/ISA/237) dated Dec. 13, 2012, by the European Patent Office as the International Searching Authority for International Application No. PCT/EP2012/068550.

Flore et al.: "Cell Reselection Parameter Optimization in UMTS", 2nd international symposium on wireless communication systems, IEEE, 2005, pp. 50-53.

\* cited by examiner

US 10,880,827 B2

POWER SAVING MECHANISM FOR MOBILE TERMINAL

TECHNICAL FIELD

The present invention relates to a network entity of a mobile network that supports participation of a mobile terminal and a corresponding method and a corresponding computer program. The present invention further relates to a mobile terminal for participating in a mobile network.

BACKGROUND OF THE INVENTION

A mobile terminal, such as an user equipment (UE), is usually operated with a battery providing the necessary energy to the mobile terminal. Concerning most mobile terminals, it is generally strived for a long standby time, as a long standby time is one key performance of a mobile terminal. During standby, a mobile terminal usually searches for an appropriate cell of a mobile communication network to camp on and associates itself to such a cell that provides comparatively strong radio signal strengths and that thus guarantees a comparatively good quality of a radio connection to the mobile communication network.

In this context, publication D. Flore et al.: "Cell Reselection Parameter Optimization in UMTS", 2nd international symposium on wireless communication systems, 2005, IEEE, pages 50-53, describes that user equipment shall regularly search for better cell to camp on according to a cell reselection criterion. Such mechanism shall ensure an acceptable quality of the camping cell. The standby time is decreased by frequent cell reselections, as performing a cell reselection causes some energy consumption. Thus, a very reactive cell reselection mechanism, that is to say: comparatively frequent cell reselections, can guarantee an adequate quality of the camping cell at the expensive of standby time. The publication furthermore describes that a mobile terminal being located in two or more mobile network cells overlapping each other compares signal strength values provided by each of the cells and associates itself to the cell that provides the higher signal strength value. In order to avoid ping-pong effects regarding the cell reselection mechanism due to signal strength values varying in a same small value range, the mobile terminal is equipped with a hysteresis control. Accordingly, the mobile terminal remains associated to a cell, as long as the received-signal strength value of a signal provided by the cell does not leave the hysteresis range. The hysteresis range is defined by a preset value of a difference in received-signal strength between an alternative cell and the currently selected cell. It is also described that increasing the hysteresis range always reduces the reselection rate. This reduction would always lead to an increase of standby time of the mobile terminal but would not necessarily lead to a reduced cell quality.

From EP 1 300 038 a terminal device is known that is configured to select a cell requiring the least amount of energy for transmitting payload data in terms of the radiated power level.

SUMMARY OF THE INVENTION

It is a technical object of the present invention to provide a network entity of a mobile network that is adapted to support power consumption sensitive cell reselection of mobile terminals participating in the mobile network. It is also a technical object of the present invention to provide a corresponding operating method for operating a network entity and a corresponding computer program.

It is furthermore a technical object of the present invention to provide a mobile terminal, in particular a stationary mobile terminal, for participating in a mobile network, wherein a standby time of the mobile terminal can be further increased. It is also a technical object of the present invention to provide a corresponding operating method for operating a mobile terminal and a corresponding computer program.

According to the first aspect of the present invention, the technical object is achieved by a network entity of a mobile network, the network entity comprising a transmitter configured to send a suggestion signal to a mobile terminal, the suggestion signal identifying to the mobile terminal, which of a possible first connection of a first technology and a possible second connection of a second technology, through each of which the mobile terminal can be connected to the mobile network, causes less energy consumption in the mobile terminal in its low-power mode of operation, which does not involve a transmission of payload data, due to a difference between the first and second technology.

A network entity can be any element in a cellular network that is responsible or involved in building up a connection with a mobile terminal. In GSM this is typically a base station controller (BSC) or base station transmitter (BST), while in WCDMA it is a NodeB, but it can refer additionally to further entities within the network where information is present concerning neighbour cells of a respective cell and signal strength information preferably received from mobile terminals.

In the outcome, the network entity of present invention, which can be, for instance, a base station or a network controller, allows a mobile terminal participating in a mobile network to identify one of a multitude of present possible connections to the mobile network that causes lowest energy consumption in the mobile terminal in its low-power mode due to a difference between the first and second technology. Therefore, the transmission of a simple signal can allow a plurality of mobile terminals to reduce their respective energy consumption by selecting the connection of that technology, which implies the lowest energy consumption in the low-power mode.

The present invention recognizes that, in the low-power mode, the mobile terminal can be in a situation, where the first possible connection and the second possible connection to the mobile network are present and wherein there are no explicit requirements for selecting one or the other connection, for instance requirements set by a network provider or requirements derived from a comparison of signal strengths/qualities of both connections. Generally spoken, the mobile terminal being in such situation could principally choose either the first possible connection or the second possible connection for connecting to the mobile network.

In contrast, according to prior art, a cell reselection is only performed autonomously by a mobile terminal in the normal mode, if the new connection has significantly better signal strength/quality. The mobile terminal of present invention, however, enables an autonomous change of the connection by the mobile terminal also in the low-power mode, based on a criterion of reduced energy consumption, which is required according to a respective technology of a given available connection, in the low-power mode by the mobile terminal.

The term "connection" is to be understood as comprising both, packet-switched and circuit-switched communication channels as different embodiments of establishing a connection having the mobile terminal as one end point. The term "possible connection" is to be understood as comprising also the currently active connection as one of a plurality of possible connections, from which the mobile terminal may select.

The normal mode is also often called "active mode". The low-power mode is in one embodiment a sleep mode. In a sleep mode, functional modules for operation of the mobile terminal are active only to minimum extent. All unnecessary components are shut down in a number of stages. However, the mobile device is registered and paging with the mobile network through a base station or a network node similar in function, through a connection.

It is noted, that the strongest effect of the invention on energy savings is achieved in the sleep mode. Still, some energy can be saved when implementing the invention alternatively in other modes of operation that do not involve a transmission of payload data. In another embodiment, such other modes of operation that do not involve payload data transmission are included with the sleep mode in the low-power mode according to the present invention to further increase its effect. In such embodiments, therefore, the low-power mode according to the present invention comprises different modes of operation, in which no payload data is transmitted between the mobile network and the mobile terminal, for instance the sleep mode and an idle mode. The idle mode is well known in the art. In the idle mode, more functional modules of the mobile terminal are active than in the sleep mode. When registered to a network in an idle mode, paging is carried out by a mobile terminal in order to achieve and maintain synchrony with the network.

The present invention is applicable to low-power modes that refer to payload transmission of any kind, voice or data. In one embodiment, the mobile device is configured to distinguish modes of operation additionally by the payload data to be transmitted, for instance voice or data. In this embodiment, separate respective normal and low-power modes of operation are provided for different types of payload data transmission. As an illustrative example of the advantageous applicability of the invention, a mobile terminal camping on a cell has to perform certain computing routines according to a relevant standard of the cell. A change to another available cell providing comparable signal strength can be of advantage.

The transmitter of the network entity can further be configured to send signalling information, e.g., via dedicated channel or broadcast, to a mobile terminal, the signalling information including adjustment information related to a low-power-consumption configuration of a cell, to which a mobile terminal is currently associated, allowing the mobile terminal to adjust a connection setting for its low-power mode of operation in dependence of the signalling information. As such the mobile terminal can be assisted by the network in selecting the low-power connection by receiving certain information from the network, i.e. power indication values. It shall be understood that, in an embodiment, the transmitter and the network entity are configured to generate and send such certain information. For instance, the network entity is configured to group cells in accordance with their associated power indication values for the low-power mode of operation of a mobile terminal.

An active support from the network, i.e., assistance in handing over the mobile terminal to a connection of a technology or network being better configured for power consumption, is advantageous. Such network support could imply that there is some information stored in the network with regard to power saving aspects of the mobile terminal. For instance, for a first type of a mobile terminal, the first possible connection could be beneficial with regard to power saving aspects, whereas for a second type of a mobile terminal, the second possible connection could be beneficial.

It shall be understood that a single term as in the present description and in the claims shall not be construed in a sense that would reduce the applicability of the present invention to a certain mobile communication standard. For instance, the mobile terminal can be a User Equipment that is adapted to participate in a second generation (2G) and/or third generation (3G) mobile communication network. The mobile network can be a 2G, 2.5G, 3G, LTE or any other mobile communication network. The mobile network can thus be any communication network enabling mobile communication via a radio access network. The applicability of the present invention is not only reduced to methods, devices and computer programs implemented/forming or participating in a wide-area-mobile communication network, such as GSM, UMTS or LTE, but the invention can also be applied in a local mobile communication network like PICO cell, WLAN, WPAN, WiFi or similar networks.

The first technology and the second technology can in alternative embodiments follow the same technology standard or different technology standards. In an example of different technology standards, the first technology may be UMTS, employing WCDMA, and the second technology may be GSM. However, in an example of identical technology standards employed, the first technology and the second technology could both be UMTS, or, more specifically, both be WCDMA, such as WCDMA DRX 9.

In particular, presence of a possible connection from the mobile terminal to the mobile network means in one embodiment that such connection is available for the mobile terminal.

It shall be understood, that the technology-based cell reselection according to the present invention can for instance be an inter-RAT or an intra-RAT reselection. Concerning UMTS, the following types of technology-based reselections are possible: 3G-3G, for instance between UMTS and another 3G system, FDD (frequency division duplex) to FDD inter-frequency, FDD/TDD (time division duplex) reselection, TDD/FDD reselection, TDD/TDD reselection, cell reselection 3G-2G (e.g. cell reselection to GSM), cell reselection 2G-3G (e.g. cell reselection from GSM).

Further technology-related variants can be implemented. For instance, a cell reselection may be based on an information, if available, which GSM frequency band is used. This is especially advantageous when a required power consumption per band is known.

A technology-based selection of the connection is in one embodiment implemented on the basis of an energy-consumption-selective connection to one of a plurality of mobile networks operated by one of a plurality of network providers. The mobile terminal of this embodiment is configured to be operated using one of a plurality of different subscriber identity modules, such as for instance a SIM, USIM, and/or component SIM. Thus the mobile terminal of this embodiment may be implemented in different variants, one providing for holding only one SIM, others for carrying different SIMs in parallel. While the term subscriber identity module is mostly used in the art with reference to a particular technology standard, namely GSM, it is to be understood in the context of the present specification in a merely functional way, that is, without restriction to a particular technology standard, be it GSM, UMTS, LTE or another technology standard.

The present invention may be used with advantage in machine-to-machine applications. Many such application devices are fixed installations equipped with a mobile terminal, for instance in the form of a radio module. Many types of mobile terminal have a SIM holder for operating the device with a removable subscriber identity module. Typically a scan for available mobile networks is performed, when the application device is being installed in the field. In this context, the present embodiment has the advantage of providing as an output information on the most energy saving connection to a mobile network in the low-power mode, irrespective of whether a SIM for any of the respective possible connections is currently installed in the mobile device or not. Upon insertion of a respective SIM for the selected connection, the mobile device can be operated under control by the controller in a particularly power-saving low-power mode, in accordance with the present embodiment of the invention.

The required routines are often associated to technology-specific, which is meant here to include also cell-specific parameters, such as a Discontinuous Reception (DRX) cycle etc. For instance, the 3GPP specification TS25.133 defines requirements for selection towards a higher ranked cell according to signal strength/quality and defines a measurement periodicity based on DRX cycle length for a mobile terminal being served by a UMTS cell. As a matter of consequence, a cell with a shorter DRX cycle leads to a higher measurement activity, whilst larger DRX cycles require less often neighbour cell measurements. In this example, the change of technology of connection in the low-power mode is formed by changing to a connection with a cell that requires less measurement activity due to a longer DRX cycle.

Alternatively or additionally to a DRX cycle length, also timer values, such as T3212 values (relevant for both UMTS and GSM), and/or Power Class values (relevant for GSM) can be considered when determining the most suited technology with regards to power consumption employed in available cells, that is to say: when identifying, which of the possible connections causes less energy consumption in the mobile terminal than the other(s) in the low-power mode.

Hence, in dependence of the technology of the currently associated cell, the power consumption in the mobile terminal in the low-power mode can be larger or smaller. Therefore, it is advantageous that the mobile terminal, when in the low-power mode, connects to the mobile network through such of possible connections that allows for less energy consumption in the mobile terminal than the other(s).

Since the connection to the mobile network causes less energy consumption in the mobile terminal in the low-power mode, the standby time of the mobile terminal can be increased. Thus, the lifetime of a battery driving the mobile terminal can be increased. These technical advantages are significant, as a long standby time is a key performance feature of a mobile terminal. This is especially valid for use of the mobile terminal in a metering application.

In accordance with a second aspect of the present invention, the technical object is achieved by a method of operating a network entity, the method comprising the step of:

sending a suggestion signal to a mobile terminal, the suggestion signal indicating to the mobile terminal, which of a first possible connection of a first technology and of a second possible connection of a second technology, through each of which the mobile terminal can be connected to the mobile network, causes less energy consumption in the mobile terminal in its low-power mode that does not involve a transmission of payload data, due to a difference between the first and second technology.

The operating method of the second aspect of the present invention shares the advantages of the network entity of the fourth aspect of the present invention. In particular, it has preferred embodiments that correspond to the preferred embodiments of the network entity described above.

According to a third aspect of the present invention, the technical object is achieved by a first computer program for operating a network entity of a mobile network, the second computer program comprising program code means for causing the network entity to carry out the step of the method of the fifth aspect of the present invention, when the second computer program is run on the computer controlling the network entity.

The first computer program of the third aspect of the present invention may each be stored/distributed on a suitable medium, such as an optical storage medium, or a solid-state medium supplied together with or as part of other hardware, but may each also be distributed in other forms, such as via the Internet or other wired or wireless telecommunications systems.

According to fourth aspect it is proposed a mobile terminal for participating in a mobile network, the mobile terminal being configured to be operated in a normal mode of operation, which involves a trans-mission of payload data, and in a low-power mode of operation, which does not involve a transmission of payload data, the mobile terminal comprising:

a detector configured to detect presence of a first possible connection to the mobile network and of a second possible connection to the mobile network, the first possible connection being a connection of a first technology and the second possible connection being a connection of a second technology, a first receiver configured to receive signalling information sent by a network entity of the mobile network, the signalling information including adjustment information related to a low power consumption configuration of a cell, to which the mobile terminal is currently associated, a controller configured to connect the mobile terminal to the mobile network through that of the possible connections, wherein the controller is further configured to adjust a connection setting in the mobile terminal for the low-power mode in dependence of the signalling information.

In an embodiment, the mobile terminal is configured to receive this knowledge via information provided in a broadcast of a serving cell. The information may be provided for the serving cell only. Such broadcast information can be limited to neighbour cells neighbouring the current serving cell and/or to especially suited cells that cause very low power consumption within the mobile terminal. Furthermore, the broadcast can be limited such that it only addresses terminals being interested in low power consumption rather than, e.g., fast mobility. The cell class information can be organized such that each cell is associated to a respective power indication value. Such values can be set by a higher network entity, such as by a RNC or, respectively, it can be calculated individually by each NodeB. Furthermore, a cell may comprise special settings for mobile terminals for low power consumption activity at the cost of reduced mobility.

This embodiment takes into account the recognition that the mobile terminal has a certain degree of freedom of how to be associated to a current cell. For instance, the current cell could define a minimum DRX cycle to which the mobile terminal has to be set. Besides such DRX cycle, a cell could define further parameters and variables that have to be considered by the mobile terminal for being connected to the cell.

The mobile terminal is advantageously a device that is not or only rarely moved and is supposed to operate for a comparatively long time. For instance, the mobile terminal can thus be a battery driven metering application device, such as a gas/water/electricity etc. metering application or a machine-to-machine (M2M) application device, operating at a fixed location and being designed for minimized energy consumption.

In this embodiment, the mobile terminal receives information from the mobile network of how to be associated to the current cell such that the energy consumption in the mobile terminal is reduced.

Hence the mobile terminal can thus be associated to the cell and operate according to different adjustment settings, wherein each of the different adjustment setting causes a respective energy consumption in the low-power mode. With the signalling information transmitted by the network entity, the mobile terminal is suggested to choose such an adjustment setting that causes lowest energy consumption in the mobile terminal in the low-power mode.

In another embodiment, the mobile terminal is configured to receive network assistance in performing cell reselection towards the best suited cell with respect to power saving by receiving, from the network, signalled or provided information on most influencing factors for power consumption, such as a DRX cycle and a number of neighbour cells to be measured. There are numerous parameters influencing power consumption in the mobile terminal. In an embodiment, the mobile terminal is configured to receive, from the network, cell class information being relevant for power saving. E.g., the cells can be grouped by the network according to the power consumption they cause in the mobile terminal. In an example, cells are classified in one of ten classes, wherein, e.g., class 10 includes cells that cause particular low energy consumption and class 1 includes cells that cause particular high energy consumption. Due to such cell class information, the mobile terminal does not have to determine itself, which of the first or the second possible connection is to be preferred. Such determination could involve complex calculations, as there can be many parameters influencing power consumption.

In a further preferred embodiment, the mobile terminal comprises a second receiver configured to receive a suggestions signal sent by a network entity of the mobile network, the suggestions signal indicating which of the first possible connection and the second possible connection is suggested by a network entity to be identified. In this embodiment, a selector is configured to identify the suggested possible connection.

Thus, the mobile terminal is supported by the mobile network in finding the best connection in terms of power saving aspects. This network support can be implemented either in addition or alternatively to a named list stored in the memory of the mobile terminal, the list naming one or more technology standards, according to which the mobile terminal is capable to operate. For instance, the list names technology standards from GSM DRX 9 down to GSM DRX 2 and from WCDMA DRX 9 down to WCDMA DRX 6, according to which the mobile terminal can operate. In an embodiment, a position of a certain technology standard named in the list identifies a preference of the certain technology standard.

E.g., the network may indicate in the list for the serving cell and also for the neighbour cell, to which classification of power saving the respective cell belongs. Furthermore, as an alternative approach, the network only indicates the most favourable cell in its broadcast.

The first receiver and the second receiver are not necessarily physically separated from each other but can be realized in a common receiver unit of the mobile terminal.

The aspect of grouping cells of a network or different networks with respect to their impact on power consumption within the mobile terminal was already outlined above.

It is preferred that, in the normal mode, the controller is configured to connect the mobile terminal to the mobile network through either the first or the second possible connection, whichever connection provides better radio conditions to the mobile terminal.

This embodiment has the advantage that the mobile terminal can be operated in two different modes. In the normal mode, the mobile terminal searches for a connection to a cell according to a known cell reselection criterion such that the most suitable radio conditions are ensured. This prior-art cell reselection does not assess the technology employed in the respective possible connection using a criterion of less energy consumption.

In this normal mode, therefore, the mobile terminal connects to the mobile network through such connection that provides the comparatively best radio conditions. The term radio conditions is used here to comprise one or more measurable parameters that are indicative of the transmission conditions of a communication channel used or to be used by the connection. Such measurable parameters are for instance a signal strength, an error rate of transmission, such as the bit or block error rate (BER), a signal-to-noise ratio, $E_b/N_0$, i.e., the ratio of energy per bit to noise power spectral density, or any other parameter.

For instance, the normal mode can be appropriate if the mobile terminal is moving and/or significant amount of data is transferred to the mobile terminal or from the mobile terminal via the mobile network, for instance during a phone call or during a download or upload of data. The normal mode can also be appropriate as a fall-back mode if in the low-power mode no difference in technology is detected. The connection that provides best radio conditions can be the connection that provides lower energy consumption in the mobile terminal, as an amplifier in the mobile terminal can be run at a lower amplification factor.

However, it is to be noted that this mere selection according to the best radio conditions is as such known in the art and not considered by the inventors as forming a part of the present invention.

It is furthermore preferred that the mobile terminal operates in the normal mode, if the first signal strength value and the second signal strength value are not in the predetermined hysteresis range.

The other mode, the low-power mode, is advantageous, if the mobile terminal is stationary and if only very few data or no data is currently transferred to the mobile terminal or from the mobile terminal to a network entity. In this mode, the mobile terminal reduces its power consumption such that a long standby time is achieved by connecting to the mobile network through either the first or the second possible connection, whichever connection allows for lower energy consumption in the mobile terminal.

It is preferred that the mobile terminal is configured to be set either to the normal mode or to the low-power mode, in particular through an AT-command.

Therefore, the above described advantages with respect to power saving aspects in a mobile terminal can in particular be achieved by a mobile network system comprising a mobile terminal according to the fourth aspect of the present invention and a network entity according to the first aspect of the present invention.

BRIEF DESCRIPTION OF THE DRAWINGS

These and other aspects of the invention will be apparent from and elucidated with reference to the embodiments described hereinafter.

In the Following Drawings.

DESCRPTION EMBODIMENTS

Figure 1:
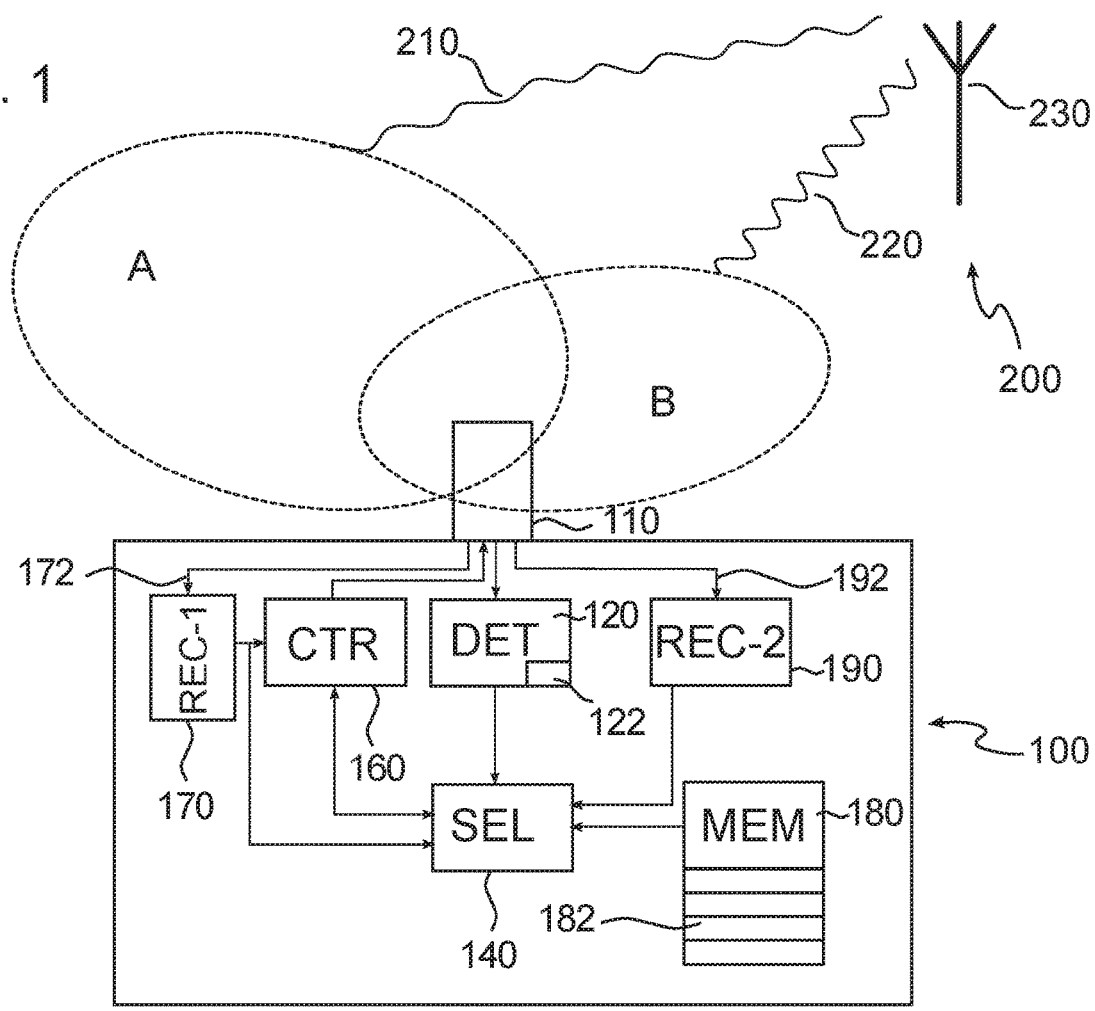
FIG. 1: shows schematically and exemplary a representation of a mobile terminal in accordance with the first aspect of the invention and a representation of a network entity in accordance with the third aspect of the invention.

FIG. 1 illustrates a typical network situation where a mobile terminal 100 has the possibility to connect to a mobile network via a network entity 200 through at least one of two connections 210, 220.

For connecting to the mobile network, the mobile terminal 100 is equipped with a coupler 110. It is illustrated that the mobile terminal 100 is located in an overlapping area of two mobile network cells A and B, wherein the first possible connection 210 is associated with the first mobile network cell A and the second possible connection 220 is associated with the second mobile network cell B. The two mobile network cells A and B can be operated by the network entity 200, which can be, for instance, a base station or a NodeB. The network entity 200 can be one of a plurality of network entities being controlled by a radio network controller (RNC), which is not shown in FIG. 1. Such RNC could be part of a UTRAN.

The mobile terminal 100 connects to the mobile network, such that energy consumption in the mobile terminal 100 is reduced within the scope of possible connections. The mobile terminal comprises a detector 120 (DET) that detects presence of the first possible connection 210 and the second possible connection 220. For instance the first possible connection 210 is a GSM connection and the second possible connection a UMTS connection. However, both possible connections 210 and 220 can also be of the same technology standard, for instance both connections 210, 220 can be UMTS connections, wherein the first connection 210 is a WCDMA DRX 6 and the second connection 220 a WCDMA DRX 9 connection.

The detector 120 not only detects that two possible connections 210, 220 are present, but also that at least one of a first received-signal strength value associated with the first possible connection 210 and a second received-signal strength value associated with the second possible connection 220 lies in a predetermined hysteresis range with respect to the respective other received-signal strength value. The predetermined hysteresis range can be stored in data storage means 122 of the detector 120. According to prior art, a mobile terminal being associated to a current cell offering a certain signal strength does not change the currently associated cell, as long as the offered signal of an alternative possible connection is within a hysteresis range of the received-signal strength in order to avoid ping-pong effects, that is to say: in order to avoid that a mobile terminal frequently changes its current connection to a mobile network only due to insignificantly enhanced radio conditions, as such frequent changes of a current connection causes high energy consumption.

The mobile terminal is configured to be operated in a normal mode of operation, which involves a transmission of payload data, and in a low-power mode of operation, which does not involve a transmission of payload data. The normal mode of operation may involve the transmission of payload data in the form of either voice data in a point-to-point circuit-switched connection, or packet data in a packet-switched connection, or both. The low-power mode typically is either the sleep mode (only), or the idle mode (only), but comprises preferably both, the sleep mode and the idle mode. Both modes are as such known in the art and have been discussed to some detail further above.

In accordance with the first aspect of the invention, the mobile terminal 100 comprises a selector 140 that identifies which of the first possible connection 210 and the second possible connection 220 causes or, respectively, allows for less energy consumption in the mobile terminal than the other in its low-power mode of operation due to a difference in technology. After the selector 140 has identified the "low power consumption" connection, a controller 160 of the mobile terminal 100 connects the mobile terminal to the mobile network through the identified possible connection, that is: either through the connection 210 or through the connection 220.

As the first possible connection 210 and the second possible connection 220 can each be associated to a respective mobile network cell, the controller is also configured to perform a cell reselection by connecting a mobile terminal 100 to the mobile network through the identified possible connection.

Accordingly, the mobile terminal 100 can be associated to the first cell A. The detector 120 detects that the first received-signal strength value provided by the first cell A lies within the predetermined hysteresis range that is stored in data storage means 122. The detector 120 furthermore detects that the second possible connection 220 through cell B is present and available. The selector 140 is notified about the two possible connections 210, 220. It identifies which of the first and the second possible connections 210, 220 allows for lower energy consumption in the mobile terminal 100. This identified connection may either be connection 210 or connection 220. The controller then connects the terminal 100 to the network through the identified connection.

The mobile terminal can further be equipped with a first receiver 170 (REC-1) that can receive signalling information 172 sent by the network entity 200 of the mobile network. For sending such signal, the network entity 200 comprises a transmitter 230.

The signalling information 172 includes information related to low-power consumption configuration of a cell for a low-power mode of operation of the mobile terminal in connection with this cell, to which a mobile terminal is currently associated. The first receiver 170 can transmit such information to the controller 160, which can adjust a connection setting in the mobile terminal 100 for the low-power mode in dependence of that transmitted information. For instance, the mobile terminal 100 has several possibilities to camp on a mobile network cell, for instance the network cell A or the network cell B. Within in the scope of such camping possibilities, energy consumption in the mobile terminal 100 can vary. Therefore, the network entity 200 sends signalling information 172 to the mobile terminal 100 that allows the mobile terminal 100 to deduct such settings thereof that lead to a reduced energy consumption in the low-power mode of operation of the mobile terminal 100.

The mobile terminal 100 can also comprise a second receiver 190 (REC-2) that receives a suggestion signal 192 sent by the network entity 200 of the mobile network. The suggestion signal 192 indicates which of the first possible connection and the second possible connection is suggested by the network entity to be identified. The selector 140 can simply identify the suggested possible connection and in the outcome, the mobile terminal 100 connects itself to the suggested/identified possible connection. Thus, an indication of a cell or a carrier to be selected by the mobile terminal, for instance a low power consuming application, can be signalled by the mobile network.

Alternatively or additionally, the mobile terminal 100 comprises a memory 180 that stores a list 182. The list 182 names one or more technology standards, according to which the mobile terminal 100 is capable to operate. If the detector 120 detects that the first possible connection 210 of the first technology standard and the second possible connection 220 of the second technology standard are present, the selector 140 identifies only such connection of the first possible connections 210 and the second possible connection 220 that is a connection according to a technology standard named in the list 182.

The list 182 furthermore comprises parameter information related to power consumption aspects for the low-power mode of operation of the mobile terminal, associated with each technology standard named in the list 182. Such information can be, for instance, decoded in a prioritizing list that stores information like "GSM DRX 9 better than WCDMA DRX 9 better than WCDMA DRX 6". For instance, if the detector 120 detects that the first possible connection 210 is a WCDMA DRX 6 connection and the second possible connection 220 is a GSM DRX 9 connection, the selector 140 would firstly determine that both technology standards are stored in the list 182 of the memory 180 and would further recognize that the second possible connection 220 is to be preferred (identified), since GSM DRX 9 allows for less energy consumption in the mobile terminal 100 than the WCDMA DRX 6.

As mentioned, the mobile terminal 100 can operate in the normal mode and in the low-power mode. In the normal mode, the controller connects the mobile terminal 100 to the mobile network through either the first 210 or the second possible connection 220, whichever connection provides better radio conditions to the mobile terminal 100. For instance, the mobile terminal 100 operates in the normal mode if the two signal strength values associated with the first possible connection 210 and the second possible 220, in comparison with each other, are not in the predetermined hysteresis range. Another case for the normal mode can be a situation where the mobile terminal 100 transmits a significant amount of data to the mobile network or, respectively, receives a significant amount of data from the mobile network, for instance during a phone call, a download or an upload. In this case, good radio conditions have to be present in order to ensure safe and fast data transfer.

In the low-power mode, the controller connects the mobile terminal through the identified (low-power consumption) connection. The low-power mode applies, if the mobile terminal 100 is not involved in a payload data transfer process.

The mobile terminal 100 can be set to either the normal mode or the low-power mode, in particular through an AT-command.

In view of the aforesaid, an advantageous application case of the mobile terminal 100 is a metering application device powered by battery. Concerning in particular a metering application, a long standby time is a key performance feature. Such long standby time is achieved by the mobile terminal 100 as it is connected to that connection of a plurality of possible connections that allows for lowest energy consumption in the mobile terminal 100 in the low-power mode. However, low power consumption can certainly also be advantageous for an application being constantly connected to an electric grid.

It shall be understood that the block diagram representation of the mobile terminal 100 primary serves for an evident description of the terminal 100. It does not relate to any geometrical or structural relation between components of an actual realization of a mobile terminal in accordance with the invention. E.g., the first receiver 170 and the second receiver 190 can be realized as a common receiver. Controller 160, detector 120 and selector 140 can be integrated in a common integrated circuit. It is furthermore possible that the selector 140 and the memory 180 are installed in an application device (not shown) and that receivers 170 and 190, controller 160, detector 120, selector 140 and coupler 110 are installed on a radio module (not shown) that is coupled to the application device via an interface and arranged separately from the application device. In such case, figuratively spoken, the controller 160, integrated in the module, can contain system determination data and can effect cell reselection. The selector coupled to the memory 180 makes the decision, through which connection the mobile terminal is to be connected, and instructs the controller 160 correspondingly via the interface (not shown).

Figure 2:
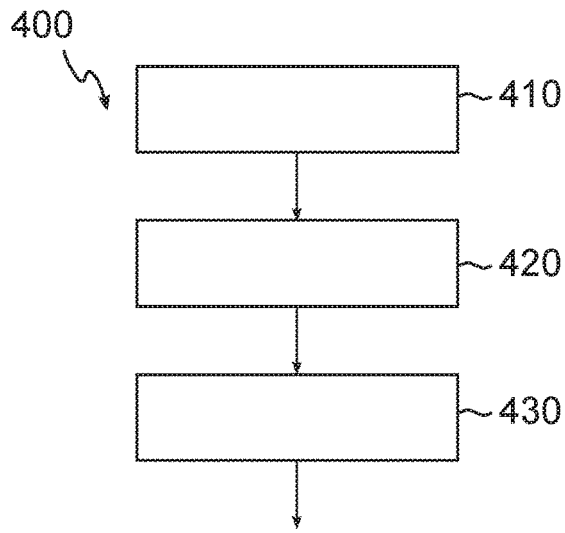
FIG. 2: shows exemplary a flow chart illustrating an embodiment of an operating method for a mobile terminal in accordance with the second aspect of the invention.

FIG. 2 exemplary shows a flow chart illustrating an embodiment 400 of an operating method of operating a mobile terminal for participating in a mobile network. For instance, the mobile terminal 100 depicted in FIG. 1 can be operated according to the method 400 depicted in FIG. 2. The mobile terminal is preferably configured to be operated in a normal mode of operation, which involves a transmission of payload data, and in a low-power mode of operation, which does not involve a transmission of payload data.

In a first step 410, a presence of a first possible connection to the mobile network and a second possible connection to the mobile network is detected, the first possible connection being a connection of a first technology and the second possible connection being a connection of a second technology.

In a second step 420, it is identified which of the first possible connection and the second possible connection causes less energy consumption in the mobile terminal in its low-power mode of operation than the other due to a difference between the first and second technology. In a third step 430, the mobile terminal is connected to the mobile network through the identified possible connection.

Figure 3:
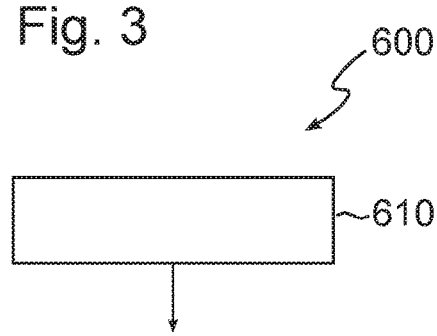
FIG. 3: shows exemplary a flow chart illustrating an embodiment of an operating method for a network entity in accordance with the fifth aspect of the invention.

In a similar manner, FIG. 3 shows exemplary a flow chart illustrating an embodiment 600 of an operating method of operating a network identity. Such network identity can be the network identity 200 depicted in FIG. 1 that comprises a transmitter 230.

The method 600 comprises the step 610 of sending a suggesting signal to a mobile terminal, the suggestion signal identifying to the mobile terminal, which of a possible first connection and a possible second connection, through each of which the mobile terminal can be connected to the mobile network, causes less energy consumption in the mobile terminal in its low-power mode of operation. The mobile terminal can be a mobile terminal like the mobile terminal 100 depicted in FIG. 1 comprising the second receiver 190 for receiving such suggestion signal.

The invention claimed is:

1. A network entity of a mobile network comprising a transmitter configured to send a suggestion signal to a mobile terminal, the suggestion signal identifying to the mobile terminal, which of a first possible connection of a first DRX cycle length and of a second possible connection of a second DRX cycle length, through each of which the mobile terminal can be connected to the mobile network, causes less energy consumption in the mobile terminal while the mobile terminal is in a low-power mode of operation of the mobile terminal due to a difference between the first DRX cycle length and the second DRX cycle length, wherein the first DRX cycle length is longer than the second DRX cycle length, wherein the suggestion signal enables the mobile terminal to identify which of the first possible connection and the second possible connection causes less energy consumption in the mobile terminal in a low-power mode of operation and causes the mobile terminal to select the identified possible connection.

2. The network entity of claim 1, wherein the transmitter is further configured to send signalling information to the mobile terminal, the signalling information including adjustment information related to a low-power consumption configuration of a cell, to which the mobile terminal is currently associated, allowing the mobile terminal to adjust a connection setting in dependence of the signalling information.

3. The network entity of claim 1, further configured to determine if the first possible connection or the second possible connection causes less energy consumption by considering at least one of:
   timer values of a cell, or
   power class value of a cell.

4. The network entity of claim 1, further configured to group cells in accordance with their associated power indication values in relation to the low-power mode of operation of the mobile terminal.

5. A method of operating a network entity, the method comprising the step of:
   sending a suggestion signal to a mobile terminal, the suggestion signal indicating to the mobile terminal, which of a first possible connection of a first DRX cycle length and of a second possible connection of a second DRX cycle length, through each of which the mobile terminal can be connected to the mobile network, causes less energy consumption in the mobile terminal while the mobile terminal is in a low-power mode of operation of the mobile terminal due to a difference between the first DRX cycle length and the second DRX cycle length, wherein the first DRX cycle length is longer than the second DRX cycle length, wherein the suggestion signal enables the mobile terminal to identify which of the first possible connection and the second possible connection causes less energy consumption in the mobile terminal in a low-power mode of operation and causes the mobile terminal to select the identified possible connection.

6. A non-transitory computer-readable medium encoded with a computer program for operating a network entity of a mobile network, the computer program comprising program code for causing the network entity to carry out the method as defined in claim 5, when the computer program is run on a computer controlling the network entity.

7. A mobile terminal for participating in a mobile network, the mobile terminal being configured to be operated in a normal mode of operation, which involves a transmission of payload data, and in a low-power mode of operation, which does not involve a transmission of payload data, the mobile terminal comprising:
   a detector configured to detect presence of a first possible connection to the mobile network and of a second possible connection to the mobile network, the first possible connection being a connection of a first DRX cycle length and the second possible connection being a connection of a second DRX cycle length,
   a first receiver configured to receive signalling information sent by a network entity of the mobile network, the signalling information including adjustment information related to a low power consumption configuration of a cell, to which the mobile terminal is currently associated,
   a second receiver configured to receive a suggestion signal sent by a network entity of the mobile network, the suggestion signal indicating which of the first possible connection and the second possible connection is suggested by the network entity to be identified as causing less energy consumption in the mobile terminal while the mobile terminal is in the low-power mode of operation due to a difference between the first DRX cycle length and the second DRX cycle length, wherein the first DRX cycle length is longer than the second DRX cycle length,
   a selector configured to identify the suggested possible connection, and
   a controller configured to connect the mobile terminal to the mobile network through the suggested possible connection,
   wherein the controller is further configured to adjust a connection setting in the mobile terminal for the low-power mode in dependence of the signalling information.

8. The mobile terminal of claim 7, wherein
   the first possible connection is associated with a first mobile network cell and the second possible connection is associated with a second mobile network cell, and wherein
   the controller is further configured to perform a cell reselection in the low-power mode by connecting the mobile terminal to the mobile network through that possible connection, which is identified by the selector.

9. The mobile terminal of claim 7, which is configured to be operated using one of a plurality of different subscriber identity modules for establishing communication with at least one mobile network, wherein the mobile terminal is configured to detect and output, which of the first possible connection using a first subscriber identity module and of the second possible connection to a mobile network using a second subscriber identity module causes less energy consumption in the mobile terminal in the low-power mode, the first possible connection being a connection of a first technology standard and the second possible connection being a connection of a second technology standard.

10. The mobile terminal of claim 7, wherein the mobile terminal is operating in the low-power mode when it is a stationary mobile terminal.

* * * * *